United States Patent
Nashi et al.

(10) Patent No.: US 9,361,390 B2
(45) Date of Patent: Jun. 7, 2016

(54) WEB CONTENT MANAGEMENT

(75) Inventors: Nadia M Nashi, Hemel Hampstead (GB); Colin R Paterson, Ipswich (GB); Hugh Carty, Kilmarnock (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1031 days.

(21) Appl. No.: 12/935,209

(22) PCT Filed: Feb. 18, 2009

(86) PCT No.: PCT/GB2009/000448
§ 371 (c)(1),
(2), (4) Date: Sep. 28, 2010

(87) PCT Pub. No.: WO2009/118503
PCT Pub. Date: Oct. 1, 2009

(65) Prior Publication Data
US 2011/0029854 A1 Feb. 3, 2011

(30) Foreign Application Priority Data
Mar. 28, 2008 (GB) .................................. 0805695.4

(51) Int. Cl.
*G06F 17/30* (2006.01)
(52) U.S. Cl.
CPC .................................. *G06F 17/3089* (2013.01)
(58) Field of Classification Search
USPC .......................................................... 715/229
See application file for complete search history.

(56) References Cited

U.S. PATENT DOCUMENTS

| | | | |
|---|---|---|---|
| 7,111,229 B2 * | 9/2006 | Nicholas et al. | 715/209 |
| 7,174,513 B1 | 2/2007 | Nickum | |
| 7,240,077 B1 | 7/2007 | Edelman et al. | |
| 7,587,515 B2 * | 9/2009 | Agarwalla et al. | 709/238 |
| 2001/0032209 A1 | 10/2001 | Duxbury | |
| 2003/0023632 A1 | 1/2003 | Ries et al. | |
| 2003/0115220 A1 | 6/2003 | Chan et al. | |
| 2003/0204810 A1 | 10/2003 | Dam et al. | |
| 2007/0067714 A1 | 3/2007 | Lin | |
| 2007/0283243 A1 | 12/2007 | Beiser et al. | |

FOREIGN PATENT DOCUMENTS

WO     WO 01/15014 A     3/2001

OTHER PUBLICATIONS

Written Opinion of the International Searching Authority (8 pgs.) for International Application No. PCT/GB2009/000448.
International Search Report for PCT/GB2009/000448, mailed May 25, 2009.

* cited by examiner

*Primary Examiner* — Kavita Padmanabhan
*Assistant Examiner* — Tionna Burke
(74) *Attorney, Agent, or Firm* — Nixon & Vanderhye P.C.

(57) ABSTRACT

A web page preview system comprising a web host for providing, in a run-time environment, a first version and a second version of a set of web pages and an interface for receiving requests from users for access to the different versions of the set of web pages. The system provides access to the first version of the set of web pages in the run-time environment to a general set of users and provides access to the second version of the set of web pages in the run-time environment to a restricted sub-set of users, so that the second version of the set of web pages may be previewed in the run-time environment by the restricted sub-set of users.

15 Claims, 5 Drawing Sheets

WEB CONTENT MANAGEMENT

This application is the U.S. national phase of International Application No. PCT/GB2009/000448 filed 18 Feb. 2009, which designated the U.S. and claims priority to European Application No. 0805695.4, filed 28 Mar. 2008, the entire contents of each of which are hereby incorporated by reference.

BACKGROUND AND SUMMARY

The invention relates web content management in general and has application to the preview of web content.

A web page comprises various items of content (i.e. data representing text, images, audio, etc for forming part of the web page) and an application (i.e. code that acts to arrange and coordinate the items of content). The application may be thought of as providing a framework into which the various items of content are fitted to form the complete web page, as viewed by a user.

Businesses have for many years been embracing the internet to expose their internal systems as a self-service offering to customers. This has provided an electronic customer information, sales and support channel that has become crucial to the commercial success of many enterprises. The ability to provide accurate, up-to-date information on a commercial internet site has taken on great significance in such enterprises.

Web content is constantly changing, necessitating the frequent introduction of new web pages or updates to existing web pages by changing the content to reflect new information or changing needs. This may be achieved by changing one or more of the data items inserted into the application framework in the run-time environment, normally under the control of a site supervisor (a user with special access rights whose job it is to maintain the website). Updating a large web page, particularly if it forms part of a large site with many pages, can be a complex task and, as a result; is prone to human error. It is important to verify that any changes have been correctly implemented and the desired effect achieved before releasing the new web pages to the general public. Some websites are provided with a preview environment to allow new or updated pages to be viewed privately by the site supervisor before transferring the pages to the run-time environment where live pages are accessible to the general public. The preview environment is, at best, a simulation of the run-time environment and is not guaranteed to give a true representation of how the web page will appear or function in the run-time environment.

Conventionally, web page preview functions are tied either to a content management system or, more recently, to a wiki site. In both cases, the preview features are restricted to a single page making it impossible to preview a set of related and complex changes together.

The structure of a commercial web site may be very complex and is key to delivering the sophisticated services that underpin modern e-commerce. In a complex, multi-page website, for which changes are managed via a content management system, users may need to follow a complex "journey" through various pages. For example, in the process of selecting and purchasing goods on a commercial web site, the user will navigate the item-viewing, selection, checkout and payment processes. This may involve being diverted to view and agree terms and conditions and, possibly, multiple security checks and requests for confirmation. Hence, a single user journey may involve the user in visiting multiple pages which need to exchange information and interact in a sophisticated way in order to provide the necessary user experience. Maintenance of such sites scan also be complex. In a further example, a product price may change (e.g. due to a special promotion). This simple-sounding change (in the sense that we are only changing a single parameter of a single object) may require a complex series of edits to the web site if, for example, the price is referred to multiple times in different locations on different web pages (e.g. in relation to "add to basket", checkout, promotional side-bars, etc). It is therefore very desirable to be able to preview changes in-context and across the whole of a multi-page website.

US2003023632 describes a content management system in which a web page pattern comprising editable blocks is first selected and then one or more of the blocks edited. Once the editing of the pattern is compete, the edits are implemented in the web page code and the modified web page is presented to the user's browser. Changes are viewed before they are pushed to the live environment so the preview does not occur at run time.

Another popular form of web site is the wiki. Wikis tend to be simple, text-based applications with a fixed structure where additions or attachments can be included by multiple authors. In contrast to the sophisticated, commercial web site, the structure of a typical wiki is much simper and is not predefined or centrally controlled but evolves as users add pages as they see fit. With a wiki, changes are implemented and previewed individually.

In summary, preview in both content management systems and wikis, is not structural. Neither the content management system nor the wiki support preview of content changes across a multi-page structure but are restricted to previewing only the text of a single page.

There is therefore a need for a facility to allow a newly-created web page or the result of changes made to an existing web page to be viewed "at runtime" (i.e. in the run-time environment). For simplicity, we shall refer to both types of change as a new page. Viewing at runtime has the advantage of allowing the web page editor to see exactly how the web page will look to the end user, once released. Releasing modified pages in the run-time environment prior to thorough checking, however, could result in inaccurate information and incorrectly functioning web pages being exposed to the general public with consequent damage to the reputation of the organisation represented in the web site. There is therefore a need for a preview facility in the run-time environment that allows restricted access to new web pages while inhibiting general access to the new pages.

The invention provides a web page preview system; in which the system comprises a web host for providing both a first version and a second version of a set of web pages in a run-time environment; and an interface for receiving requests from users for access to the different versions of the set of web pages; in which the system is arranged in use to provide access to the first version of the set of web pages in the run-time environment to a general set of users; and in which the system is arranged in use to provide access to the second version of the set of web pages in the run-time environment to a restricted sub-set of users; so that the second version of the set of web pages may be previewed in the run-time environment by the restricted sub-set of users.

According to an aspect of the invention, access is provided to the first version of the set of web pages in the run-time environment to the general set of users in response to a first mode of request and access is provided to the second version of the set of web pages in the run-time environment to the restricted sub-set of users in response to a second mode of request.

According to a further aspect of the invention, the web host is arranged in use to replace the first version of the set of web pages with the second version of the set of web pages following preview by the restricted sub-set of users.

According to a further aspect of the invention, the first version of the set of web pages comprises an application and a first item of content; in which the second version of the set of web pages comprises the application and a second item of content. According to a further aspect of the invention, the second version of the set of web pages comprises the first items of content.

According to a further aspect of the invention, each of the first version of the set of web pages and the second version of the set of web pages comprises a single page. According to a further aspect of the invention, editing of the web pages is inhibited in the run-time environment.

The invention also provides a method of previewing a set of web pages; in which the method includes: providing in a run-time environment a first version of the set of web pages and a second version of the set of web pages; receiving one or more requests for access to the web pages; responding to the requests by providing in the run-time environment access to the first version of the set of web pages to a general set of users; and providing in the run-time environment access to the second version of the set of web pages to a restricted sub-set of users; so as to allow the restricted sub-set of users to preview the second version of the set of web pages in the run-time environment.

According to an aspect of the invention, the method includes providing to the restricted sub-set of users simultaneous access to both the first version and the second version of the set of web pages in the run-time environment.

According to a further aspect of the invention, the method includes releasing the previewed second version of the set of web pages to the general set of users by replacing the first version of the set of web pages with the second version of the set of web pages following preview by the restricted sub-set of users.

According to a further aspect of the invention, the method includes overwriting the first version of the set of web pages with the previewed second version of the set of web pages.

According to a further aspect of the invention, the web page requests comprise a first mode and a second mode: in which access to the first version of the set of web pages is provided in response to the first mode of web page request, access to the second version of the set of web pages is provided in response to the second mode of web page request; and in which the second mode of request is restricted to the restricted sub-set of users.

According to a further aspect of the invention, the method includes copying the first version of the set of web pages to an edit environment; modifying in the edit environment the first version of the set of web pages to produce the second version of the set of web pages; and transferring the second version of the set of web pages to the run-time environment with restricted access.

According to a further aspect of the invention, the first version of the set of web pages comprises an application and one or more first items of content; and the second version of the set of web pages comprises the application and one or more further items of content. According to a further aspect of the invention, each of the first version of the set of web pages and the second version of the set of web pages comprises a single page.

According to a further aspect of the invention, the second version of the set of web pages comprises a plurality of pages, in which the method includes providing in the run-time environment access to multiple pages of the second version of the set of web pages so as to allow the restricted sub-set of users to preview the second version of the set of web pages across the multiple pages.

Because the content may be valuable, the invention in a further embodiment inhibits writes, preventing changes to the content in the run-time environment and, consequently, only offering preview in the run-time environment. The invention allows the preview of an entire website or any section of a website, as required, whether or not it is has been updated. The invention supports changes of varying complexity.

BRIEF DESCRIPTION OF THE DRAWINGS

To aid understanding of the invention, embodiments will now be described by way of example only, with reference to the accompanying drawings in which:

FIG. 7 shows a schematic of a server for implementing the invention.

DETAILED DESCRIPTION

Figure 1:
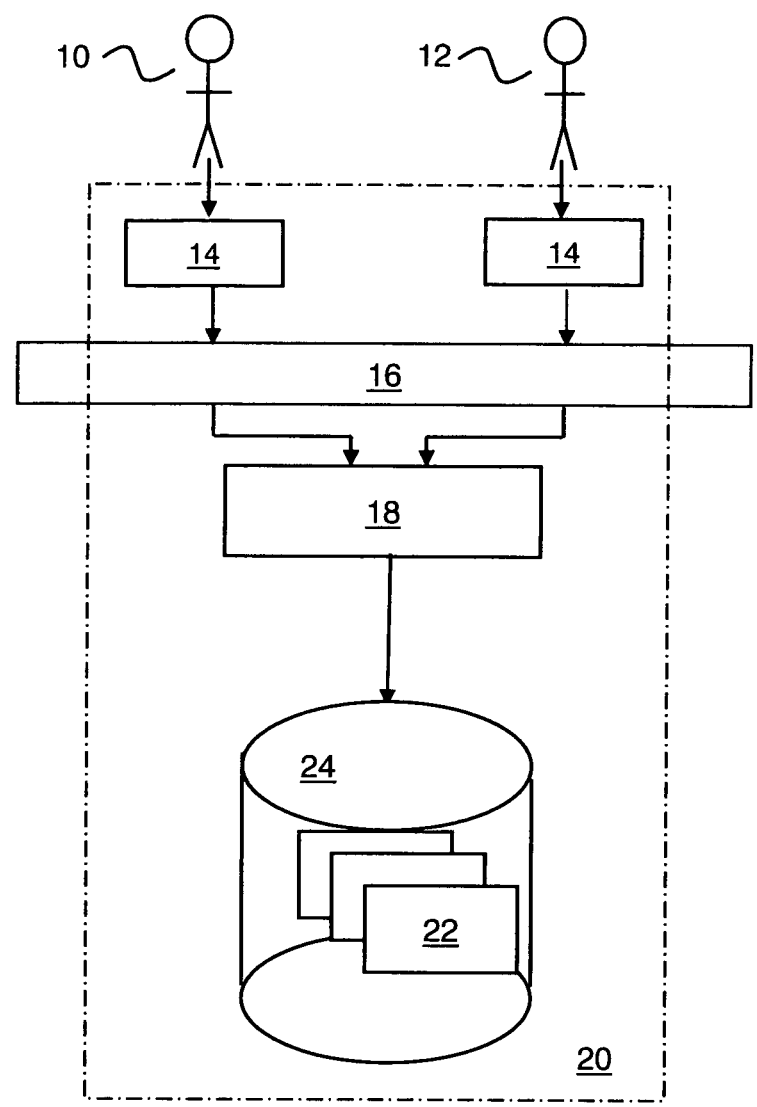
FIG. 1 shows a schematic of a conventional wiki system.

FIG. 1 shows preview within the context of a conventional wiki system. Although wikis allow previewing, the scope of the preview feature is constrained with respect to the number of pages that can be previewed and, once changes are applied, with respect to the capability for reversing the changes.

FIG. 1 shows normal users 10, 12 requesting and receiving information via the Internet. Normal users 10, 12 are in communication with web content via browsers 14 internet 16 and web server 18. Web server 18 responds to requests received from users 10, 12 for data comprised in web content 22 of database 24. In FIG. 1, browser 14 internet 16, web server 18 and content 24 form part of the run-time environment 20.

Figure 2:
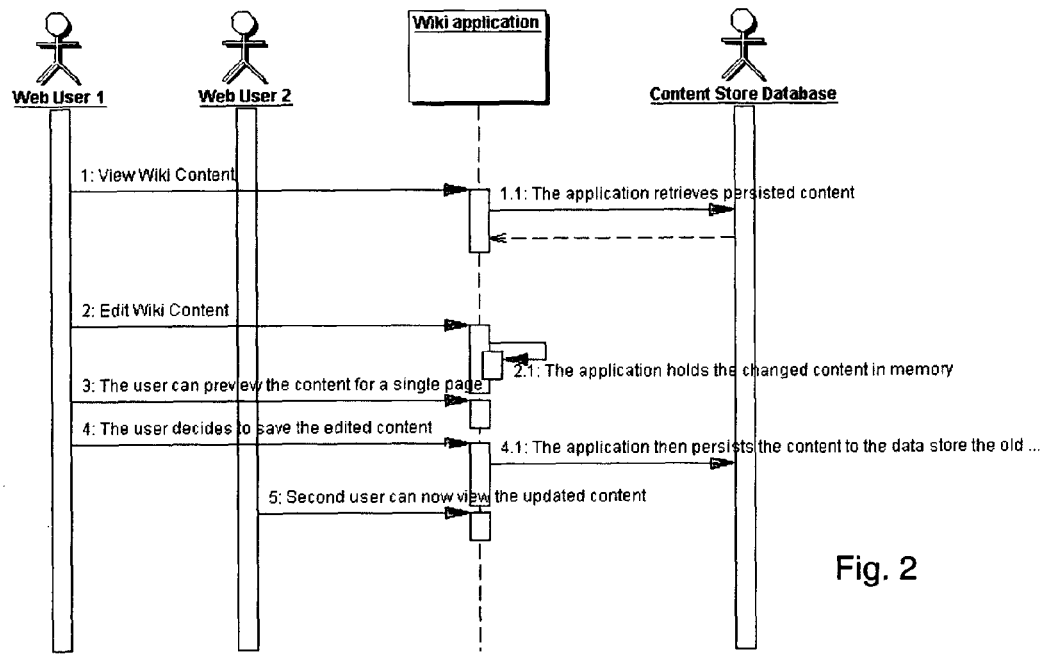
FIG. 2 shows a sequence diagram, relating to the wiki system of FIG. 1.

FIG. 2 comprises a Unified Modelling Language (UML)-style sequence diagram showing the sequence of flow in viewing, editing and persisting content in a conventional wiki system. In the conventional wiki system, there is only one set of live content and one preview set. The original content is overwritten with the previewed content as part of a save operation. Typically, the content is changed in the run-time environment without a workflow or verification process A web page editing operation in the context of the wiki system of FIG. 1 will now be described with reference to the UML diagram of FIG. 2. In FIG. 2 normal users 10, 12 of FIG. 1 are represented as web user 1 and web user 2, respectively. Web user 1 seeks to access and edit content via a Wiki application which may be supported by a web server such as web server 18 in FIG. 1. The content is stored at a content store database equivalent to database 24 in FIG. 1. The actions of the users in the sequence of FIG. 2 are numbered consecutively as follows:

At 1, web user 1 requests access to Wiki content from the Wiki application. At 1.1, the Wiki application retrieves the requested, persisted data from a content store database. At 2, web user 1 edits the retrieved content on the Wiki application. As shown at 2.1, the Wiki application stores the content, as changed by web user 1, in memory. At 3 web user 1 previews the content for a single page on the Wiki application. At 4 web user 1 decides that the new content is acceptable and instructs the Wiki application to save the new content. At 4.1 the Wiki application transfers the new content to the content store database for persistent storage, so overwriting any corresponding existing content. As shown at 5, the second user can now view the new content via the Wiki application. While the first user is editing the content outside of the run-time environment, the second user has access to the original content in the run-time environment.

The wiki preview feature is offered outside of the run-time environment in a special, preview environment which typically only shows parts of content and shows pages outside their context. This is especially limiting in dynamic systems when the pages are constructed on-the-fly. The limited preview function means that errors in writing new content can occur more easily and are harder to identify when content preview is carried out outside of the run-time environment.

Figure 3:
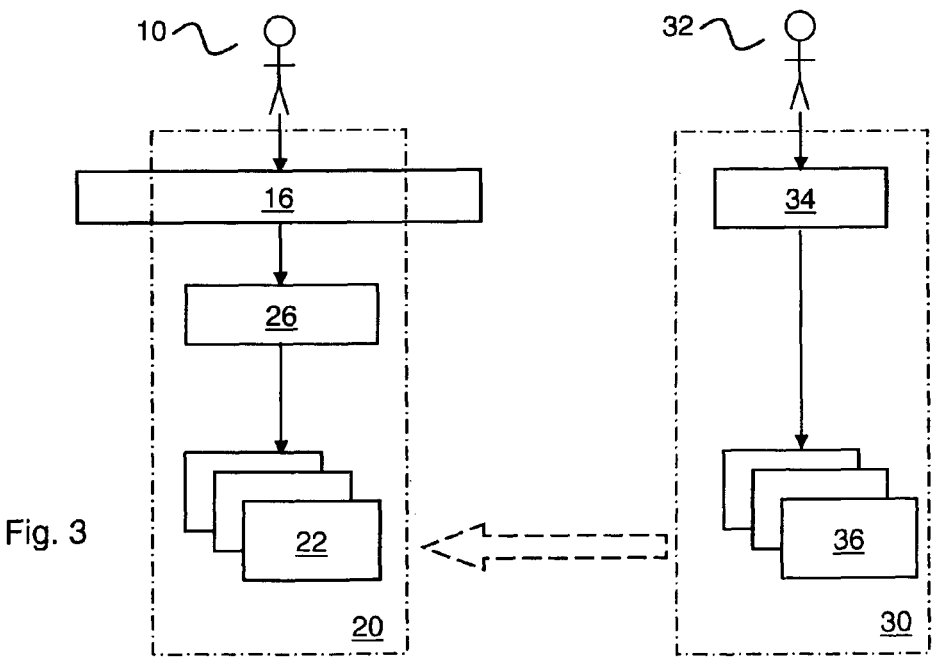
FIG. 3 shows a schematic of a conventional content management system.

FIG. 3 shows web content preview in the context of a traditional content management system. A content management system is a sophisticated user interface (UI) enabling the pulling together of various forms of content (text, images, etc) for editing to produce web pages in conformance with templates and other rule sets. Content management system allows for easy and controlled editing and supports basic preview outside of the run-time environment. The rules and templates of the content management system can help avoid the kind of error and bad design which can result in malfunctioning when released in the run-time environment but does not provide the ability to test the new page in the run-time environment in a controlled way in order to verify the behaviour of the new web page before it is released to the public. A suitable content management system is Teamsite, available from Interwoven.

According to the conventional content management system of FIG. 3, new content is edited and saved in a preview environment. It is then pushed from the preview environment to the live environment. As with the wiki context of FIGS. 1 and 2, the preview feature of the traditional content management system is offered outside of the run-time environment in a special, preview environment which typically shows excerpts of content and shows pages outside their context.

In FIG. 3 normal user 10 accesses web content 22 via internet 16 and web server 26 in run-time environment 20, in a similar fashion to that described above with reference to FIG. 1. For clarity, database 24 is not shown in FIG. 3 or subsequent Figures but the various items of web content will be understood to reside in one or more database. FIG. 3 also shows a privileged user, i.e. supervisor 32, accessing and editing updated web content 36 via user interface 34 in preview environment 30. The editing and previewing by supervisor 32 takes place in preview environment 30: a separate environment from run-time environment 20. Once supervisor 32 has viewed the content in preview environment 30 and is satisfied with the changes, preview content 36 is transferred to run-time environment 20 and replaces either the whole or relevant parts of current web content 22.

The invention offers the web user the ability to both view the original web content and to preview the changed web content, giving the user the ability to compare the original with the updated content, to check changes and to view the changes in the context of the run-time environment before general release.

Figure 4:
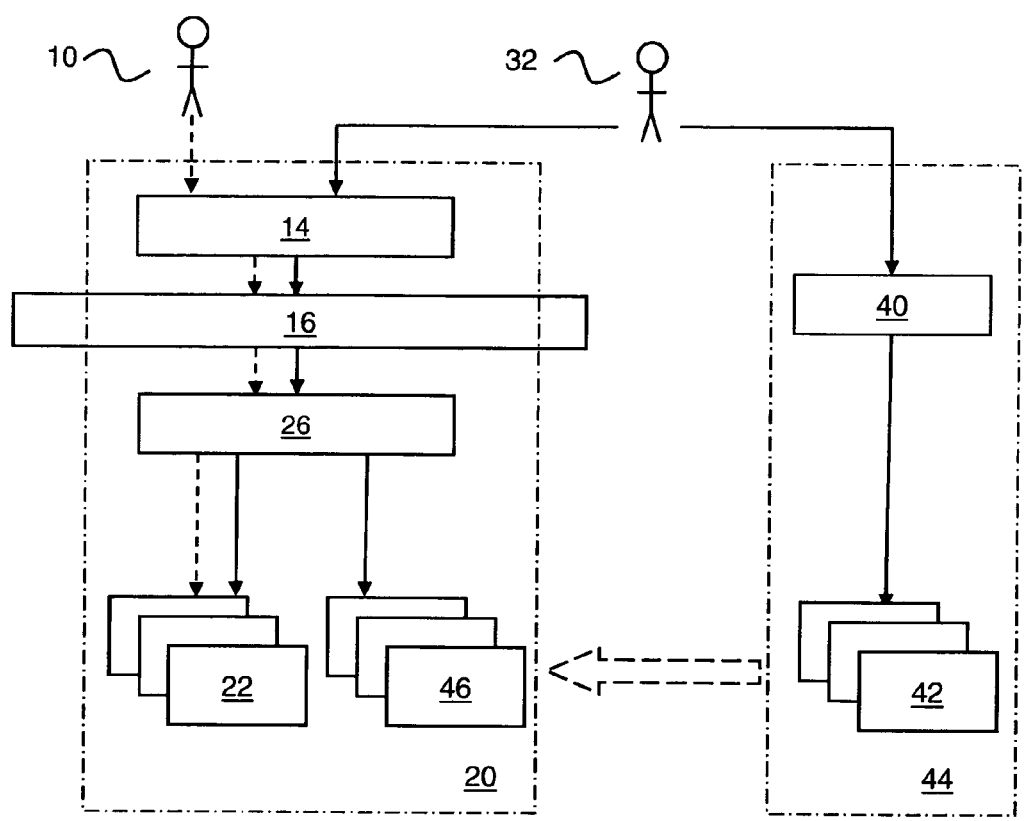
FIGS. 4, 5 and 7 show schematics of a web content management system according to the invention.

FIG. 4 illustrates how the original content 22 and the new content 42 co-exist and can be viewed simultaneously within the framework of a single application (run-time environment 20), according to an embodiment of the present invention.

FIG. 4 again shows normal user 10 accessing web content 22 in run-time environment 20 via browser 14, internet 16 and web server 26. Normal web user 10 only has access (as denoted by the broken-line arrows) from their web browser 14 to the original, published content 22. FIG. 4 also shows edit environment 44 with supervisor 32 accessing and editing preview content 42 via user interface 40 in edit environment 44. Supervisor 32 is able to transfer new content 42 from edit environment 44 to provide a copy 46 in run-time environment 20. This allows supervisor 32 to create content or implement changes to existing content "off-line" in edit environment 44. Unlike the conventional system of FIG. 3, new content 46 is maintained in run-time environment 20 separate from published content 22. Having the edit function and preview function divided between two separate systems gives flexibility to support complex changes and allow preview of any section of a web page, not necessarily tied to an update. Edit environment 44 can advantageously be arranged locally to supervisor 32—providing more secure and faster access whilst allowing the use of editing tools not supported by the run-time environment. Once reviewed and passed in edit environment 44, the new content 42 is transferred to provide copy 46 in run-time environment 20. The transfer involves "pushing" (i.e. transferring new content 42 when ready and without waiting for a request) from an edit server (not shown) in edit environment 44 to a web server 26 in run-time environment 20. Advantageously, the server in edit environment 44 and web server 26 may be connected via fast pipes (for very-high bandwidth data transfer) over a conventional private network, such as an Ethernet LAN (not shown). Once transferred to run-time environment 20, copy 46 of new content 42 becomes available in run-time environment 20, initially to supervisor 32 only.

It will be noted that, unlike the wiki environment of FIG. 1 and the content management system of FIG. 3, the run-time environment of FIG. 4 maintains both current web content 22 and new content 46 in parallel in run-time environment 20. In addition to having access to new content 46, supervisor 32 also has access to current web content 22 in run-time environment 20 via browser 14, internet 16 and web server 26, as before. Hence, supervisor 32 has simultaneous access (as denoted by the solid arrows) to both the original content 22 and the new content 46 in run-time environment 20 via browser 14, internet 16 and web server 26. According to an embodiment, access to the different versions 22, 46 is controlled based on a run-time parameter in web-page requests issued under control of the relevant user from user's browser 14 to web server 26 (see the discussion of modes of service, below).

A preferred embodiment of the invention is based on the content management persistence module (CMIM). CMIM is a connector that facilitates serving content between a content management system and a java enabled application. Typically; this would be a web application. The module enables content to be previewed before publishing. CMIM is able to provide preview of an entire web site rather than being restricted to preview in the context of a particular change.

Figure 5:
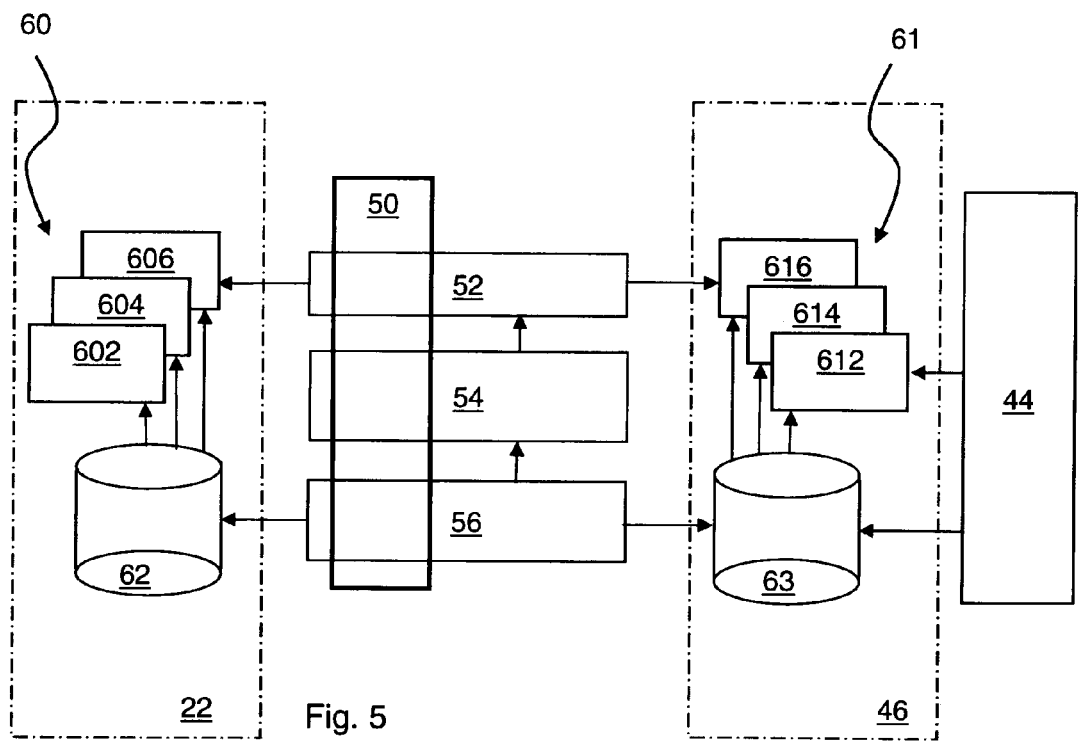

The Content Management Integration Module (CMIM) 50 of FIG. 5 supports content preview according to the present invention. Here, content preview is the ability provided to a privileged user to view content privately in run-time environment 20 before allowing a wider audience (such as all members of a particular organisation or the general public) to have access to the content. The privileged user is normally a system administrator or similar, responsible for maintaining and updating the website. Privileged content preview is facilitated by including a special variable in website access requests from the privileged user. This functionality allows the privileged user to check new web content to ensure that the content is right and is correctly displayed in the appropriate context before making it more widely available.

As can be seen from FIG. 5, CMIM 50 extends across three tiers: presentation tier 52, business logic tier 54 and persistence tier 56 (described in more detail, below).

According to the present invention, dual database schema and file system content are saved and maintained in run-time environment 20 to support the preview function. In more detail, FIG. 5, shows dual file systems 60, 61 for content and dual databases 62, 63 for data and metadata. XHTML/HTML content files 602, 604, 606 on file system 60 support current content 22. XHTML/HTML content files 612, 614, 616 on file system 61 support new content 46. The content on each file system is described by the data and metadata in the corresponding database. Database 62 supports current web content 22. Database 63 supports new content 46.

With reference to FIG. 5, presentation tier 52 is in communication with dual instances of file systems 60, 61, for viewing content. Persistence tier 56 is in communication with dual databases 62, 63 for loading new content and editing existing content. New XHTML/HTML content files 612, 614, 616 for new content 46 are transferred from edit environment 44 to file system 61 under control of content management system (not shown). Data and meta data for new content 46 are transferred from edit environment 44 to database 63 under control of content management system (not shown).

The Document Table

The meta data which describes the data on the file system is held within two database tables: the document table and the document metadata table. The document table, below, includes a unique identifier per content item and the file path on the system.

| Column | Type | Description |
|---|---|---|
| ID | NUMERIC | A unique numeric value sequentially generated |
| PATH | VARCHAR (254) | The path on the file system |
| DOCUMENT_SIZE | NUMERIC (15) | The document size in bytes |
| AUTHOR | NUMERIC (15) | The author of the document |
| CREATION_DATE | TIMESTAMP | The date when the document has been created in the content management system |
| MODIFIED_DATE | TIMESTAMP | The date when the document has been changed in the content management system |
| DESCRIPTION | VARCHAR (2000) | A brief description of the content document |
| MIME_TYPE | VARCHAR (100) | Type of the document e.g. .txt or .doc or .pdf or .xls and so on |
| DOCUMENT_LIVE_DATE | TIMESTAMP | The date of which the document has been designated to go live |
| DOCUMENT_RETIRE_DATE | TIMESTAMP | The date of which the document has been designated to be removed from the live site |
| PRODUCT_ID | VARCHAR | The product Id of the document if the content item represents a product record |

The Document Metadata Table

The document meta-data table, below, includes value/name pair attributes for each content item.

| Column | Type | Description |
|---|---|---|
| ID | NUMBER | A unique numeric value sequentially generated |
| DOCUMENT_ID | NUMBER | A foreign key representing the document entity referring to the ID value in the DOCUMENT table described in the previous section |
| NAME | VARCHAR (240) | The name of the attribute describing the document |
| STATE | VARCHAR (50) | Not used at present |
| VALUE | VARCHAR (2000) | The value of the attribute describing the document |

The Presentation Tier

CMIM presentation tier 52 is composed of single custom tag library. Tag libraries reduce the necessity to embed large amounts of Java code in java server pages (JSP) by moving functionality into tag implementation classes. CMIM custom tag library provides a set of tags that can be used from within in a java server page as with any standard tag. CMIM custom tags allow the client application to:

1. Find a piece of content based on a set of criteria (name-value paired attributes) and given a specific sort order in the request;
2. Find a document given its document ID;
3. Find a product given its product ID;
4. Retrieve content and present it within a UI channel.

The Business Logic Tier

Business logic tier 54 is comprises an API which provides an interface to presentation tier 52. The separation between the presentation tier and the business logic tier renders modifications to the presentation tier more straightforward and less costly than modifications to the business logic tier. Business logic tier 54 is preferably based on Spring Framework: an application framework for the Java platform widely available under an open source license.

The Persistence tier

Persistence tier 56 is preferably based on Hibernate: an object-relational mapping library supporting mapping from Java classes to database tables, which is also widely available under an open source license. CMIM enhances features of the standard Hibernate library.

Figure 6:
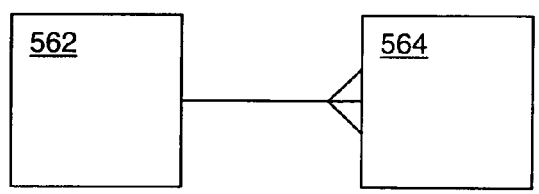
FIG. 6 shows a database logical view according to the invention.
Figure 7:
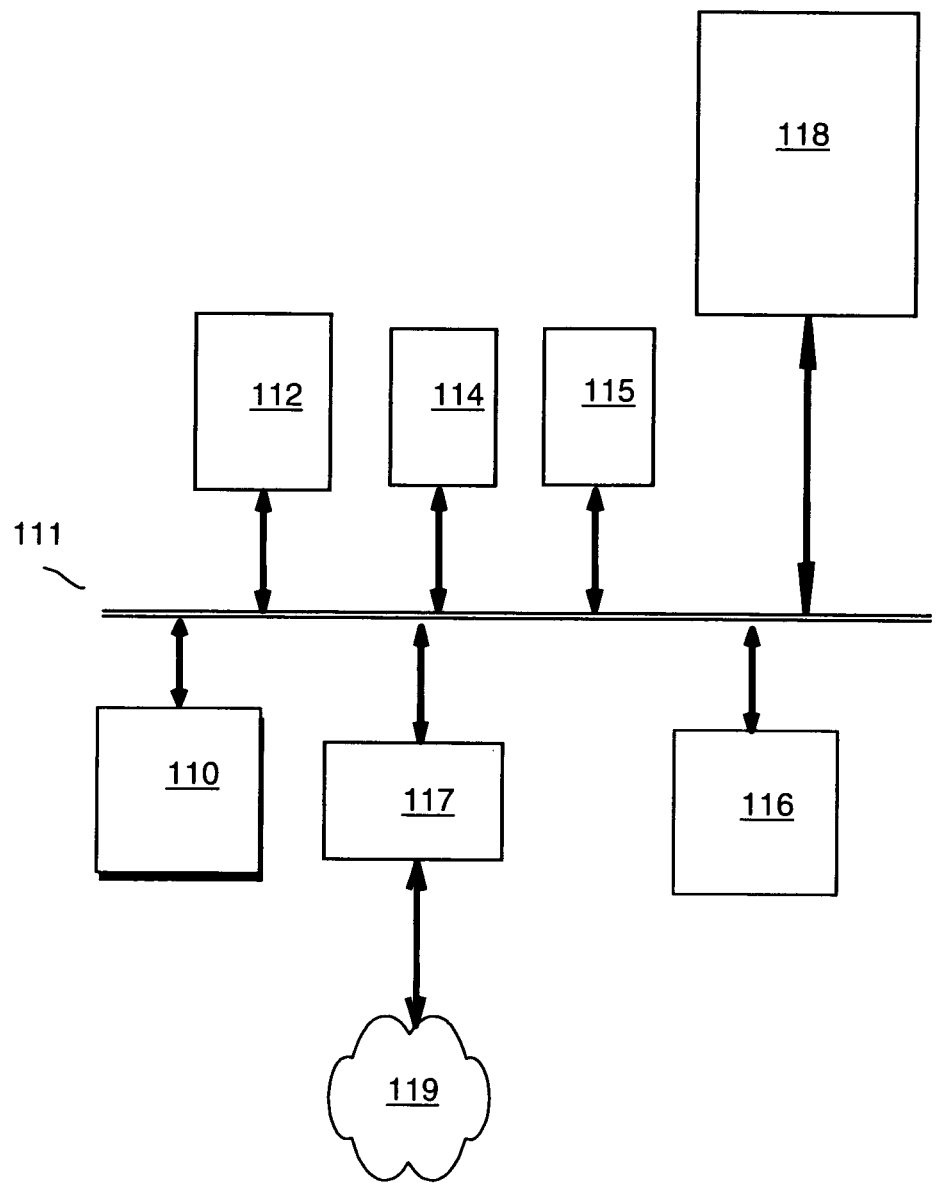

FIG. 6 shows the entity relationship representation in the data base. As illustrated in FIG. 6, according to an embodiment of the invention, the content on the file system is described by metadata in the database. The metadata is held within two data base tables: the document table 562 and the document metadata table 564. According to an alternative embodiment, the content is also held in a database.

Modes of Service

CMIM 50 is written to be run in two modes of service. The mode to use is decided by privileged user 32 at the UI level (14, 40) by choice of parameter in the access request. If a "preview mode" parameter is passed in the URL associated with an access request which indicates that the mode of service is "true", then CMIM 50 will select the preview data and content to display to the user, e.g. privileged user 32. An example of a suitable URL parameter is: "http:<base url>?previewmode=true".

If a "preview mode" parameter is passed in the URL associated with an access request which indicates that the mode of service is "false", then the application will select the default content 22 to display to the requesting User, e.g. standard user 10 or privileged user 32. An example of a suitable URL parameter is: "http:<base url>?previewmode=false".

Finally, if the parameter is absent (e.g.: URL=http:<base url>) then the application will default to selecting the default content 22 to display to the requesting user, e.g. standard user 10 or privileged user 32.

Any of the above web pages will typically comprise an application and many items of content, although both current content 22 and new content 46 could each comprise a singe item of content. In theory, new content 46 could comprise completely different items to current content 22. Either of current content 22 and new content 46 could comprise a single web page or set of related web pages.

The present invention relates to changing web content and offers a way to view both the original (pre-change) version and the updated (post-change) version of content simultaneously in the run-time environment. In one embodiment, a web server is able to present the original, unaltered version of the webpage to both the supervisor and normal users whilst presenting the updated version only to the supervisor or similar, specially-authorised user. Hence, unlike the normal user, the supervisor is able to access both versions at the same time. Advantageously, the integrity of both versions of the webpage is preserved. If the updated version is deemed acceptable, it can then be used to replace the original version and be released to all users. Alternatively, a new page can be trialled in the run-time environment prior to release to the general public.

Advantageously, the invention allows changes to be applied to any number of different web pages on a site and to provide the supervisor with the ability to preview the updated version of all the web pages before releasing any of them. This is particularly useful in complex web sites where a change to one web page may require corresponding changes to one or more further pages. The ability to preview a number of pages together before release allows for more thorough checking to be carried out to ensure, prior to any of the updated pages being released, that the set of changes implemented is accurate and consistent.

The powerful preview facility is suitable for supporting workflow processes, allowing different authorisers to view, in the run-time environment and prior to general release, all pages of a web site, both updated and unchanged. Advantageously, CMIM supports editing in an off-line environment for added security and control, together with preview in the run-time environment.

As will be understood by those skilled in the art, the invention may be implemented in software, any or all of which may be contained on various transmission and/or storage media such as a floppy disc, CD-ROM, or magnetic media so that the program can be loaded onto one or more general purpose computers or could be downloaded over a computer network using a suitable transmission medium. The computer program product used to implement the invention may be embodied on any suitable carrier readable by a suitable computer input device, such as CD-ROM, optically readable marks, magnetic media, punched card or tape, or on an electromagnetic or optical signal.

As will be understood by those skilled in the art, the or each web browser 14, web server 18 and database 24 may be implemented on one or more commercially available server, personal computer or similar processing means. FIG. 10 shows a typical architecture for a processing means suitable for implementing the communications system according to a further embodiment of the invention. In practice, a number of such means will typically be required. The processing means comprises a central processing unit (CPU) 110 for executing software programs and managing and controlling the operation of the processing means. The CPU 110 is connected to a number of devices via a bus 111, the devices including a storage device 112, for example a hard disk drive for storing system and application software and memory devices including ROM 114 and RAM 115. The computer further includes network interfaces 117 for interfacing to external network 119, e.g. the Internet. The computer can also include user input/output devices such as a mouse and keyboard (not shown) connected to the bus 111 via an input/output port 116, as well as a display 118. It will be understood by the skilled person that the above described architecture is not limiting, but is merely an example of typical processing means architecture. It will be further understood that the described processing means has all the necessary operating and application software to enable it to fulfil its purpose.

The above embodiments are to be understood as illustrative examples of the invention. Further embodiments of the invention are envisaged and will be evident to the skilled reader. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The text of the abstract is incorporated hereby: a web page preview system comprising a web host for providing, in a run-time environment, a first version and a second version of a set of web pages and an interface for receiving requests from users for access to the different versions of the set of web pages. The system provides access to the first version of the set of web pages in the run-time environment to a general set of users and provides access to the second version of the set of web pages in the run-time environment to a restricted sub-set of users, so that the second version of the set of web pages may be previewed in the run-time environment by the restricted sub-set of users.

What is claimed is:

1. A web page preview system, the system comprising:
    a web host for hosting both a first version and a different second version of a set of web pages in a run-time environment, the web host comprising a computer processor; and
    an interface for receiving requests from users for access to the different versions of the set of web pages;
    in which the system is arranged in use to provide access to the first version of the set of web pages in the run-time environment to a general set of users;
    in which, simultaneously with providing access to the first version of the set of web pages in the run-time environment to the general set of users, the system is arranged in use to provide access to the different second version of the set of web pages in the run-time environment to a restricted sub-set of users, so that the second version of the set of web pages may be previewed in the run-time environment by the restricted sub-set of users; and in which editing of the web pages is inhibited in the run-time environment.

2. A web page preview system, as claimed in claim 1, in which access is provided to the first version of the set of web pages in the run-time environment to the general set of users in response to a first mode of request and access is provided to the second version of the set of web pages in the run-time environment to the restricted sub-set of users in response to a second mode of request.

3. A web page preview system, as claimed in claim 1, in which the web host is arranged in use to replace the first version of the set of web pages with the second version of the set of web pages following preview by the restricted sub-set of users.

4. A web page preview system as claimed in claim 1, in which the first version of the set of web pages comprises an application and a first item of content; in which the second version of the set of web pages comprises the application and a second item of content.

5. A web page preview system as claimed in claim 4, in which the second version of the set of web pages comprises the first items of content.

6. A web page preview system as claimed in claim 1, in which each of the first version of the set of web pages and the second version of the set of web pages comprises a single page.

7. A method of previewing a set of web pages, the method comprising:

hosting in a run-time environment a first version of the set of web pages and a different second version of the set of web pages;

receiving one or more requests for access to the different versions of the set of web pages;

responding to the requests by providing in the run-time environment access to the first version of the set of web pages to a general set of users;

simultaneously with providing in the run-time environment access to the first version of the set of web pages to the general set of users, providing in the run-time environment access to the different second version of the set of web pages to a restricted sub-set of users, so as to allow the restricted sub-set of users to preview the second version of the set of web pages in the run-time environment; and providing to the restricted sub-set of users simultaneous access to both the first version and the second version of the set of web pages in the run-time environment.

8. A method as claimed in claim 7, including releasing the previewed second version of the set of web pages to the general set of users by replacing the first version of the set of web pages with the second version of the set of web pages following preview by the restricted sub-set of users.

9. A method as claimed in claim 7, including overwriting the first version of the set of web pages with the previewed second version of the set of web pages.

10. A method as claimed in claim 7, in which the web page requests comprise a first mode and a second mode: in which
access to the first version of the set of web pages is provided in response to the first mode of web page request,
access to the second version of the set of web pages is provided in response to the second mode of web page request; and
in which the second mode of request is restricted to the restricted sub-set of users.

11. A method as claimed in claim 7, including the steps of:
copying the first version of the set of web pages to an edit environment;
modifying in the edit environment the first version of the set of web pages to produce the second version of the set of web pages; and
transferring the second version of the set of web pages to the run-time environment with restricted access.

12. A method as claimed in claim 7, in which the first version of the set of web pages comprises an application and one or more first items of content; and the second version of the set of web pages comprises the application and one or more further items of content.

13. A method as claimed in claim 7, in which each of the first version of the set of web pages and the second version of the set of web pages comprises a single page.

14. A method as claimed in claim 7, in which the second version of the set of web pages comprises a plurality of pages, in which the method includes providing in the run-time environment access to multiple pages of the second version of the set of web pages so as to allow the restricted sub-set of users to preview the second version of the set of web pages across the multiple pages.

15. A non-transitory computer program product, comprising instructions that when performed by a computer perform acts comprising a method of previewing a set of web pages; in which the method includes:

hosting in a run-time environment a first version of the set of web pages and a different second version of the set of web pages;

receiving one or more requests for access to the different versions of the set of web pages;

responding to the requests by providing in the run-time environment access to the first version of the set of web pages to a general set of users;

simultaneously with providing in the run-time environment access to the first version of the set of web pages to the general set of users, providing in the run-time environment access to the different second version of the set of web pages to a restricted sub-set of users, so as to allow the restricted sub-set of users to preview the second version of the set of web pages in the run-time environment; and providing to the restricted sub-set of users simultaneous access to both the first version and the second version of the set of web pages in the run-time environment.

* * * * *